US008364117B2

(12) United States Patent  (10) Patent No.: US 8,364,117 B2
Hawkins  (45) Date of Patent: Jan. 29, 2013

(54) SYSTEM AND METHOD FOR UPDATING LOCATION INFORMATION OF VOICE-OVER-INTERNET PROTOCOL BASED DEVICES FOR E911 SERVICE

(75) Inventor: Johnny D. Hawkins, Kansas City, MO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1186 days.

(21) Appl. No.: 12/070,775

(22) Filed: Feb. 21, 2008

(65) Prior Publication Data

US 2009/0215427 A1 Aug. 27, 2009

(51) Int. Cl.
H04M 11/04 (2006.01)

(52) U.S. Cl. .................. 455/404.2; 455/435.1; 455/415; 455/410; 455/411; 455/413; 455/404.1; 455/422.1; 455/456.5

(58) Field of Classification Search ............... 455/404.2, 455/435.1, 415, 410, 411, 413, 404.1, 422.1, 455/456.5, 456.1; 701/201, 200; 379/88.01; 370/351, 353, 354, 401, 352, 329, 328, 356, 370/316, 493
See application file for complete search history.

(56) References Cited

U.S. PATENT DOCUMENTS

| | | | |
|---|---|---|---|
| 5,339,351 A | | 8/1994 | Hoskinson et al. |
| 5,379,337 A | | 1/1995 | Castillo et al. |
| 5,497,149 A | | 3/1996 | Fast |
| 5,555,286 A | | 9/1996 | Tendler |
| 5,646,987 A | | 7/1997 | Gerber et al. |
| 5,710,803 A | | 1/1998 | Kowal et al. |
| 5,941,930 A | * | 8/1999 | Morimoto et al. ............ 701/201 |
| 6,240,285 B1 | | 5/2001 | Blum et al. |
| 6,317,049 B1 | | 11/2001 | Toubia et al. |
| 6,366,772 B1 | | 4/2002 | Arnson |
| 6,377,169 B1 | | 4/2002 | Yanagisawa |
| 6,405,033 B1 | | 6/2002 | Kennedy et al. |
| 6,415,018 B1 | | 7/2002 | Antonucci et al. |
| 6,424,908 B2 | * | 7/2002 | Urban et al. .................. 701/200 |
| 6,456,695 B2 | | 9/2002 | Lee |
| 6,480,578 B1 | | 11/2002 | Allport |
| 6,526,125 B1 | | 2/2003 | Lindsay et al. |
| 6,631,184 B1 | | 10/2003 | Weiner |
| 6,636,732 B1 | | 10/2003 | Boling et al. |
| 6,690,932 B1 | | 2/2004 | Barnier et al. |
| 7,026,925 B2 | | 4/2006 | Roche et al. |
| 7,079,627 B2 | | 7/2006 | Crago et al. |
| 7,095,733 B1 | | 8/2006 | Yarlagadda et al. |

(Continued)

OTHER PUBLICATIONS

Dale N. Hatfield, "A Report on Technical and Operational Issues Impacting the Provision of Wireless Enhanced 911 Services," Federal Communications Commission, printed from the World Wide Web on May 8, 2006 (54 pages).

(Continued)

*Primary Examiner* — Joseph Arevalo
(74) *Attorney, Agent, or Firm* — Swanson & Bratschun, L.L.C.

(57) ABSTRACT

A system and method for updating physical address location information of a wireless device for E911 services. The updating may include determining that the current geographical coordinate location of the wireless device has moved beyond a predetermined distance from a last recorded geographical coordinate location. A physical address location associated with the current geographical coordinate location may then be updated. The physical address location may be updated in the wireless device and/or a data repository operating on a data packet network. The physical address location may be communicated to a public safety answering point (PSAP) in response to an emergency 911 call being placed.

11 Claims, 5 Drawing Sheets

U.S. PATENT DOCUMENTS

| | | | |
|---|---|---|---|
| 7,231,218 B2 | 6/2007 | Diacakis et al. | |
| 7,269,413 B2 | 9/2007 | Kraft | |
| 7,391,784 B1 | 6/2008 | Renkel | |
| 7,418,087 B2 | 8/2008 | Luneau et al. | |
| 7,444,238 B1* | 10/2008 | Opitz | 701/454 |
| 7,496,189 B2 | 2/2009 | Clarisse et al. | |
| 7,679,505 B1 | 3/2010 | Vallaire | |
| 7,706,356 B1 | 4/2010 | Olshansky et al. | |
| 7,734,019 B1* | 6/2010 | Terpstra | 379/37 |
| 2001/0003843 A1 | 6/2001 | Scepanovic et al. | |
| 2001/0004588 A1 | 6/2001 | Hong | |
| 2001/0012379 A1 | 8/2001 | Amemiya et al. | |
| 2002/0016189 A1 | 2/2002 | Sheynblat et al. | |
| 2002/0068584 A1* | 6/2002 | Gage et al. | 455/456 |
| 2002/0136363 A1 | 9/2002 | Stumer et al. | |
| 2003/0063714 A1 | 4/2003 | Stumer et al. | |
| 2003/0109245 A1 | 6/2003 | McCalmont et al. | |
| 2003/0122779 A1 | 7/2003 | Martin et al. | |
| 2003/0133450 A1 | 7/2003 | Baum | |
| 2003/0162554 A1 | 8/2003 | Kim | |
| 2004/0029610 A1 | 2/2004 | Ihira et al. | |
| 2004/0056770 A1 | 3/2004 | Metcalf | |
| 2004/0063439 A1 | 4/2004 | Glazko et al. | |
| 2004/0072583 A1 | 4/2004 | Weng | |
| 2004/0113836 A1 | 6/2004 | Rickerson, Jr. | |
| 2004/0157564 A1 | 8/2004 | Murakami et al. | |
| 2004/0176123 A1 | 9/2004 | Chin et al. | |
| 2004/0185871 A1 | 9/2004 | Somani et al. | |
| 2004/0198329 A1 | 10/2004 | Vasa | |
| 2005/0003797 A1 | 1/2005 | Baldwin | |
| 2005/0048947 A1 | 3/2005 | Holland et al. | |
| 2005/0070315 A1 | 3/2005 | Rai et al. | |
| 2005/0085257 A1 | 4/2005 | Laird et al. | |
| 2005/0097380 A1 | 5/2005 | Kim | |
| 2005/0101287 A1 | 5/2005 | Jin et al. | |
| 2005/0111630 A1 | 5/2005 | Potorny et al. | |
| 2005/0169248 A1 | 8/2005 | Truesdale et al. | |
| 2005/0197096 A1 | 9/2005 | Yang et al. | |
| 2005/0201358 A1 | 9/2005 | Nelson et al. | |
| 2005/0209781 A1 | 9/2005 | Anderson | |
| 2005/0239477 A1 | 10/2005 | Kim et al. | |
| 2005/0265326 A1 | 12/2005 | Laliberte | |
| 2005/0277405 A1* | 12/2005 | Noguchi | 455/411 |
| 2006/0009243 A1 | 1/2006 | Dahan et al. | |
| 2006/0052134 A1 | 3/2006 | Sato | |
| 2006/0056620 A1* | 3/2006 | Shingal et al. | 380/28 |
| 2006/0133582 A1 | 6/2006 | McCulloch | |
| 2006/0145841 A1 | 7/2006 | Daurensan et al. | |
| 2006/0166685 A1 | 7/2006 | Adkins | |
| 2006/0217105 A1 | 9/2006 | Kumar et al. | |
| 2006/0217136 A1 | 9/2006 | Bantukul et al. | |
| 2006/0219542 A1 | 10/2006 | Savir | |
| 2006/0222151 A1 | 10/2006 | Goldman et al. | |
| 2006/0227122 A1 | 10/2006 | Proctor | |
| 2006/0229100 A1 | 10/2006 | Born | |
| 2006/0238384 A1 | 10/2006 | Hess et al. | |
| 2006/0276168 A1 | 12/2006 | Fuller et al. | |
| 2006/0293024 A1 | 12/2006 | Benco et al. | |
| 2007/0001902 A1* | 1/2007 | Kuo et al. | 342/357.13 |
| 2007/0003024 A1 | 1/2007 | Olivier et al. | |
| 2007/0082652 A1 | 4/2007 | Hartigan et al. | |
| 2007/0201391 A1 | 8/2007 | Belmonte et al. | |
| 2007/0201645 A1 | 8/2007 | Gass et al. | |
| 2007/0273519 A1 | 11/2007 | Ichikawa et al. | |
| 2007/0280428 A1 | 12/2007 | McClelland | |
| 2007/0287473 A1 | 12/2007 | Dupray | |
| 2008/0001734 A1 | 1/2008 | Stilp et al. | |
| 2008/0013696 A1 | 1/2008 | Motley et al. | |
| 2008/0057944 A1 | 3/2008 | Miriyala et al. | |
| 2008/0057987 A1 | 3/2008 | Landschaft et al. | |
| 2008/0070553 A1* | 3/2008 | Yamakawa et al. | 455/413 |
| 2008/0122929 A1 | 5/2008 | Chukwu | |
| 2008/0227427 A1 | 9/2008 | Kadavallur et al. | |
| 2008/0254810 A1 | 10/2008 | Fok et al. | |
| 2008/0273670 A1 | 11/2008 | Dickinson | |
| 2008/0275950 A1* | 11/2008 | Jordan | 709/203 |
| 2009/0047924 A1 | 2/2009 | Ray et al. | |
| 2009/0064039 A1 | 3/2009 | Lee et al. | |
| 2009/0121930 A1 | 5/2009 | Bennett et al. | |
| 2009/0131072 A1* | 5/2009 | Razdan et al. | 455/456.1 |
| 2009/0144157 A1 | 6/2009 | Saracino et al. | |
| 2009/0186596 A1 | 7/2009 | Kaltsukis | |
| 2009/0197567 A1 | 8/2009 | Ogram | |
| 2009/0215428 A1 | 8/2009 | Noldus et al. | |
| 2009/0227225 A1 | 9/2009 | Mitchell et al. | |
| 2009/0233573 A1 | 9/2009 | Gray | |
| 2009/0310602 A1 | 12/2009 | Olshansky et al. | |
| 2010/0098062 A1 | 4/2010 | Croak et al. | |
| 2010/0291894 A1 | 11/2010 | Pipes | |

OTHER PUBLICATIONS

Ansi, "TIA Standard Telecommunications Telephone Terminal Equipment Caller Identity and Visual Message Waiting Indicator Equipment Performance Requirements," TIA-777-A, Revision of TIA/EIA-777, May 1, 2003 (77 pages).

Micro Engineering Labs, Inc., "Caller ID", Retrieved from the Internet at URL: <http://www.melabs.com/resources/callerid.htm> on Apr. 24, 2006; Copyright 2006 by microEngineering Labs, Inc (as of date of retrieval, article last updated Apr. 16, 2006) (3 pages).

Dave Ryan & Asher Hazanchuk, "On-Hook & Off-Hook Caller ID Using DSP," Circuit Cellular INK # 83, Jun. 1997 (12 pages).

Ittiam Systems, "Caller Identification (CLI or Caller ID)," Retrieved from the Internet on Apr. 24, 2006 at URL <http://www.ittiam.com/pages/products/cid.htm, downloaded from the World Wide Web on Apr. 24, 2006 (2 pages).

Non-Final Rejection mailed Jan. 19, 2011 for U.S. Appl. No. 11/430,232.

Non-Final Rejection mailed Mar. 17, 2011 for U.S. Appl. No. 11/640,714.

RCE filed on Apr. 4, 2011 for U.S. Appl. No. 11/891,784.

Final Rejection mailed Jan. 3, 2011 for U.S. Appl. No. 11/891,784.

Non-Final Rejection mailed Mar. 4, 2011 for U.S. Appl. No. 12/257,424.

"NENA Recommended Generic Standards for E9-1-1 PSAP Equipment" NENA Technical Reference. NENA-04-001 Issue 2, Mar. 2001.

Non-Final Rejection mailed Mar. 28, 2011 for U.S. Appl. No. 12/272,238.

Non-Final Rejection mailed Apr. 1, 2011 for U.S. Appl. No. 12/257,655.

Non-Final Rejection mailed Mar. 3, 2011 for U.S. Appl. No. 12/257,416.

Non-Final Rejection mailed Mar. 17, 2011 for U.S. Appl. No. 12/257,640.

"AT & T Wireless Unleashes the First and Only Wireless Messaging Device", PhysOrg.com, Sep. 30, 2004; available online at URL: <http://www.physorg.com/news1392.html> (12 pages).

Non-Final Office Action date mailed Aug. 3, 2010 for U.S. Appl. No. 11/891,784.

Response filed Nov. 2, 2010 for U.S. Appl. No. 11/891,784.

U.S. Appl. No. 12/257,674; Notice of Allowance dated Jan. 25, 2012; 7 pages.

U.S. Appl. No. 12/257,674; Final Rejection dated Oct. 3, 2011; 15 pages.

U.S. Appl. No. 12/257,674 Non-Final Rejection dated Apr. 28, 2011; 14 pages.

U.S. Appl. No. 12/257,717; Final Rejection dated Jan. 23, 2012; 16 pages.

U.S. Appl. No. 12/257,717; Non-Final Rejection dated Sep. 13, 2011; 14 pages.

U.S. Appl. No. 12/257,736; Non-Final Rejection dated Apr. 28, 2011; 15 pages.

U.S. Appl. No. 12/257,736; Final Rejection dated Nov. 23, 2011; 17 pages.

U.S. Appl. No. 12/257,736; Amendment and Request for Continued Examination dated Feb. 22, 2012; 12 pages.

U.S. Appl. No. 12/257,725; Final Rejection dated Jan. 17, 2012; 17 pages.

U.S. Appl. No. 12/257,725; Non-Final Rejection dated Jul. 19, 2011; 26 pages.

U.S. Appl. No. 12/257,640; Non-Final Rejection dated Jan. 4, 2012; 19 pages.
U.S. Appl. No. 12/257,640; Final Rejection dated Aug. 17, 2011; 11 pages.
U.S. Appl. No. 12/257,655; Final Rejection dated Sep. 16, 2011; 20 pages.
U.S. Appl. No. 12/257,655; Amendment and Request for Continued Examination dated Dec. 16, 2011; 14 pages.
U.S. Appl. No. 12/257,836 Non-Final Rejection dated Nov. 29, 2011; 13 pages.
U.S. Appl. No. 12/257.836; Non-Final Rejection dated Jun. 8, 2011; 15 pages.
U.S. Appl. No. 12/257,687; Non-Final Rejection dated Apr. 9, 2012; 16 pages.
U.S. Appl. No. 12/257,687; Non-Final Rejection dated May 10, 2011; 14 pages.
U.S. Appl. No. 12/257,687; Final Rejection dated Sep. 29, 2011; 12 pages.
U.S. Appl. No. 12/257,416; Final Rejection dated Jul. 14, 2011; 17 pages.
U.S. Appl. No. 12/257,416; Final Rejection dated Jun. 13, 2012; 38 pages.
U.S. Appl. No. 12/257,640; Final Rejection dated May 2, 2012; 18 pages.
U.S. Appl. No. 12/257,836; Final Rejection dated May 14, 2012; 26 pages.
U.S. Appl. No. 12/257,655; Non-Final Rejection dated Jul. 17, 2012; 26 pages.
U.S. Appl. No. 12/257,674; Non-Final Rejection dated Jul. 20, 2012; 21 pages.
U.S. Appl. No. 12/257,687; Final Rejection dated Aug. 31, 2012; 19 pages.
U.S. Appl. No. 12/257,717; Non-Final Rejection dated Aug. 16, 2012; 42 pages.
U.S. Appl. No. 12/257,836; Non-Final Rejection dated Sep. 12, 2012; 25 pages.

* cited by examiner

SYSTEM AND METHOD FOR UPDATING LOCATION INFORMATION OF VOICE-OVER-INTERNET PROTOCOL BASED DEVICES FOR E911 SERVICE

BACKGROUND

The National Telecommunications Information Administration (NTIA) is the executive branch's advisory agency on telecommunications issues. In the early 1980s, this agency proposed a plan to raise awareness of a single emergency telephone number to the general public. From that program, the National Emergency Number Association (NENA), a non-profit organization, was created. NENA has since become a leading organization to improving technology and developing guidelines for 9-1-1 ("911") telephone calls (i.e., emergency telephone calls) to improve response by emergency rescue teams.

Telecommunications have been changing rapidly over the past several years primarily since the development and growth of the mobile telephone industry and the Internet. New forms of telecommunications have been developing as well. Traditional telecommunications were performed over the public switch telephone network (PSTN). A system to maintain location of subscribers of telecommunications companies operating on the PSTN was developed. Determining the location of subscribers of the telecommunications companies was relatively easy as the locations of telephones were known by the telecommunications companies or carriers due to installing the telephones, establishing billing, or otherwise. However, with the new forms of telecommunications, subscribers are able to use wireless devices that may access different wireless access points to communicate over a communications network, such as the Internet. One common interface for wireless access to a communications network includes the IEEE 802.11 communications protocol which is commonly known by the brand name Wireless Fidelity or WiFi. Wireless devices are being configured to have WiFi communications protocols to enable a subscriber to access WiFi enabled access points. Many WiFi enabled wireless devices have global positioning system (GPS) capabilities that are able to communicate GPS location information (i.e., latitude and longitude geographical coordinates) of the WiFi enabled device. While GPS location information may be helpful to track or locate a person at a precise geographical location, such information is not extremely useful in an emergency situation where emergency rescue personnel, such as firemen and police, better understand physical address location information (e.g., street address) for performing an emergency rescue in an emergency situation.

A public safety answering position (PSAP) is used by emergency services to answer calls from the public to notify emergency personnel to respond to an emergency situation. Traditionally, a caller would contact a PSAP and provide location information during the telephone call. When caller identification (i.e., caller ID) was introduced, PSAPs were installed with telephone systems compatible with caller ID to identify names and phone numbers of individuals placing emergency 911 calls. This first version of caller ID is known as type I caller ID. Type I caller ID operates in a single data message format (SDMF) or multiple data message format (MDMF) that provide a caller's telephone number, date, and time of the call during the ringing interval.

A second type of caller ID or type II caller ID was later developed to communicate name and telephone number information of a calling party to a called party when a call between a called party and a first calling party is in progress. Type II caller ID uses a multiple data message format (MDMF) that communicates a caller's name, telephone number, date, and time. Enhanced 911 is a North American Telephone Network (NATN) feature of the 911-emergency-calling system that uses a reverse telephone directory provided by cellular telephone companies to determine location information of a caller.

There are two types of E911 systems that operate within the United States, Phase I and Phase II. E911 Phase I systems are required to provide an operator with the telephone number, originator, and location of the cell site or base station receiving a 911 call. E911 Phase II systems are required to provide an operator with the telephone number, originator, GPS coordinates, location of the caller with a higher degree of accuracy than E911 Phase I, and use automatic location identification (ALI) database at the PSAP that is used to provide physical address location information to a PSAP operator. However, only 18% of all PSAPs are configured with E911 Phase II systems. The remaining 82% of PSAPs are configured with E911 Phase I systems, which are incapable of handling GPS coordinates, and, therefore, subscribers who have wireless telephones that use GPS coordinates for 911 emergency calls cannot be properly serviced by these PSAPs. If a caller is using a non-cellular wireless device, such as a WiFi enabled wireless device (e.g., softphone), or if a caller is using any other Voice-Over-Internet Protocol (VoIP) based phone, an operator at a PSAP with E911 Phase I capabilities is unable to determine address location based on GPS coordinates that are received from the caller. As softphones are often used in laptop computers that are moved from one network access point, such as a WiFi access point to another, emergency 911 calls may be placed from locations other than a user's home. Many newer laptop computers are installed with GPS capabilities to be used for certain applications, such as emergency 911 calls. Softphones and other wireless devices with GPS capabilities suffer from the limitations described above. Currently, there is no way to ensure that the PSAP will receive a current physical address location of a caller in the event the wireless devices are physically moved.

SUMMARY

To address the problem of PSAP operators not receiving physical address locations of wireless devices, such as VoIP phones from callers to emergency E911 services, the principles of the present invention provide for a system and method for updating physical address location information for E911 services.

One embodiment of a method of automatically updating location information may include determining a current geographic coordinate location of a wireless device. The wireless device may be in communication with a data packet communications network In response to determining that the current geographic coordinate location of the wireless device has moved beyond a predetermined distance from a last recorded geographic coordinate location, a physical address location associated with the current geographic coordinate location may be updated.

One embodiment of a system for automatically updating location information may include a processing unit configured to determine a current geographic coordinate location of a wireless device. The wireless device may be in communication with a data packet communications network. The system may further be configured to update a physical address location associated with the current geographic coordinate location in response to determining that the current geographic coordinate location of the wireless device has moved beyond a predetermined distance from a last recorded geographic coordinate location.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
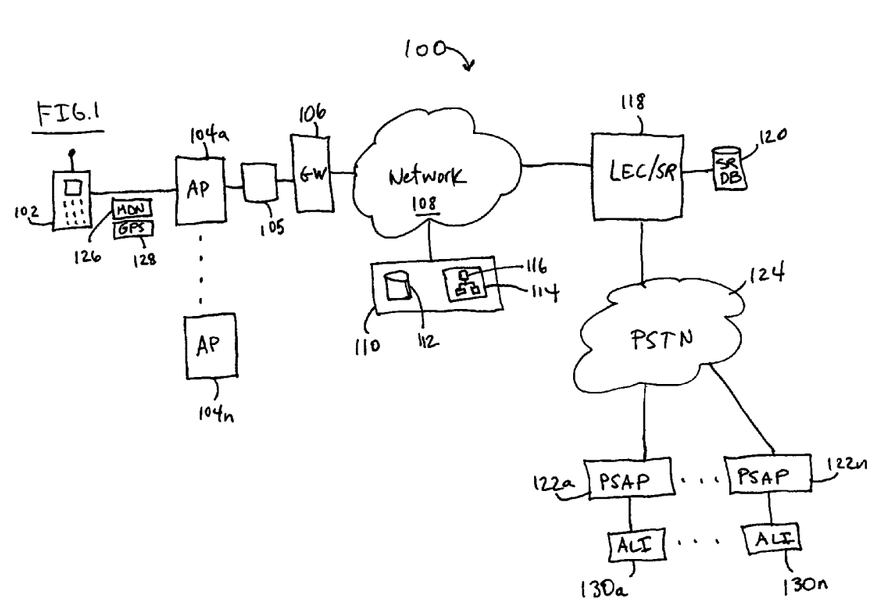
FIG. 1 is an illustration of an exemplary environment for updating physical address location information for a wireless device for E911 services.

FIG. 1 is an illustration of an exemplary environment 100 for updating physical address location information for a wireless device 102 for E911 services. In one embodiment, the wireless device 102 is a VoIP wireless device that uses a VoIP communication protocol. The wireless device 102 may be in communication with wireless access points 104a-104n (collectively 104), which enable subscribers using WiFi enabled VoIP devices to access a gateway 106 connected to network 108 via a controller 105. Access to the network 108 may occur if the controller 105 determines that communications signals being received from a wireless access point 104 are to be communicated over a network, such as network 108. In this case, the controller 105 may communicate the communications signals to the gateway 106 for communication over the network 108. The gateway 106 may operate as an interpreter between networks to translate signals of one network and signals of another network In an alternative embodiment, the controller 105 may be part of the gateway 106. It should be understood that the gateway 106 may interpret between other communications protocols not limited to this example.

The network 108 may be in communication with a network server 110. In one embodiment, the network server 110 may be configured to store a history of physical address locations corresponding to geographical coordinates, where the geographical coordinates may be azimuth and elevation coordinates. The physical address locations may include street address, city, state, zip code, building name, floor number, site name, airport name, terminal number or letter, gate, or any other indicia indicative of a physical address. Within the network server 110 there may be a storage unit 112 and processing unit 114 that executes software 116 to facilitate updating the physical address location information of the wireless device 102. The elements of the network server 110 will be described below in further detail.

Additionally connected to the network 108 may be a local exchange carrier/selective router (LEC/SR) 118. The selective router 118 may communicate with a selective router database 120 in determining which PSAP 122a-122n (collectively 122) to route an emergency 911 call from the wireless device 102 via the public switched telephone network (PSTN) 124. The gateway 106 communicates or routes the mobile directory number 126 and GPS information 128 to the appropriate selective router 118. The selective router 118 communicates the mobile directory number 126 and GPS information 128 to selective router database 120, which looks up a PSAP network address that is servicing the geographic location of the wireless device 102. The PSAPs 122 may be in communication with local automated location identifier (ALI) databases 130a-130n (collectively 130, hereinafter "ALI") that are capable of supporting respective PSAPs 122 for determining a physical address location of a caller. Because not all PSAPs are configured with local ALIs, the principles of the present invention use GPS coordinates and past call history to additionally determine the physical location address of the wireless device 102.

Because wireless device 102 can communicate via different WiFi access points 104 while moving within a WiFi mesh network (not shown) as understood in the art, physical address location information of the wireless device 102 and WiFi access points 104 may not be available to the PSAPs 122. PSAPs 122 with E911 Phase II capabilities can determine physical address location information by performing a reverse lookup using a local ALI as understood in the art, but PSAPs with E911 Phase I capabilities cannot determine physical address location of either a VoIP-based wireless device or WiFi access point.

In one embodiment, the principles of the present invention may use abbreviated dialing codes (ADC) to notify the gateway 106 of an emergency 911 call, which, in turn, may provide a PSAP 122a with the address location of wireless device 102 in response to the PSAP 122a going off-hook to answer the 911 call. In one embodiment, the wireless device 102 may store a current physical address location and communicate the physical address location by including the physical address location information in a caller ID data packet, and one of the PSAPs 122 supporting the area from which the caller is calling may receive the physical address location via the caller ID data packet, as described in co-pending U.S. patent application Ser. Nos. 11/904,883 and 11/974,775, which are incorporated herein by reference in their entirety, for display to an operator.

Figure 2:
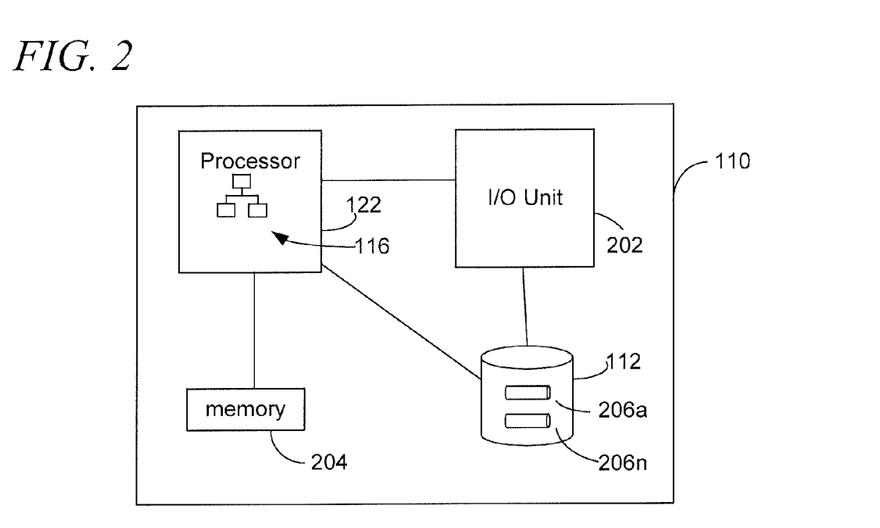
FIG. 2 is a block diagram of a network server configured to facilitate updating physical address location information of a wireless device for E911 services.

FIG. 2 is a block diagram of network server 110 of FIG. 1 configured to facilitate updating physical address location information of a wireless device for E911 services. The network server 110 may include processing unit 114 capable of processing software 116, an input/output (I/O) unit 202 for communicating with remote systems, memory 204, and storage unit 112 that stores one or more data repositories 206a-206n (collectively 206). In an exemplary embodiment, the I/O unit 202 may receive geographical coordinates from a wireless device and the software 116 being executed on the processor 114 may determine if there is a physical address location associated with the geographical coordinates stored in the data repositories 206. If a matching physical address location is located, the physical address location may be returned over the network 108 to the wireless device. In one embodiment, historical records that include previous physical address locations at which the wireless device 102 had been may be stored in the data repositories 206 for lookup.

In one embodiment, the wireless device 102 (FIG. 1) may encompass the same or analogous software as provided in the network server 110 to locate the physical address location information locally. In this example, a history of the geographical coordinates and associated physical address locations may be stored in the wireless device 102. TABLE I shows exemplary data, including geographical and physical address location data, as stored on either the network server 110 or on wireless device. In operation, when geographical coordinates may be received by the processing unit 122, a query may be made to the storage unit 112 to look up a corresponding physical address location. The same or analogous operation may be performed by a processor operating on a wireless device. As shown, a longitude, latitude coordinate of 32.78N, 96.81W corresponds to physical address location 2001 Ross Avenue. In either case, a caller ID data packet may be utilized to communicate the physical address location information.

TABLE I

| Longitude | Latitude | Physical Address Location |
|---|---|---|
| 32.78N | 96.81W | 2001 Ross Avenue . . . |
| X2 | Y2 | 3717 Cole Avenue |
| X3 | Y3 | . . . |
| . . . | . . . | . . . |

Figure 3:
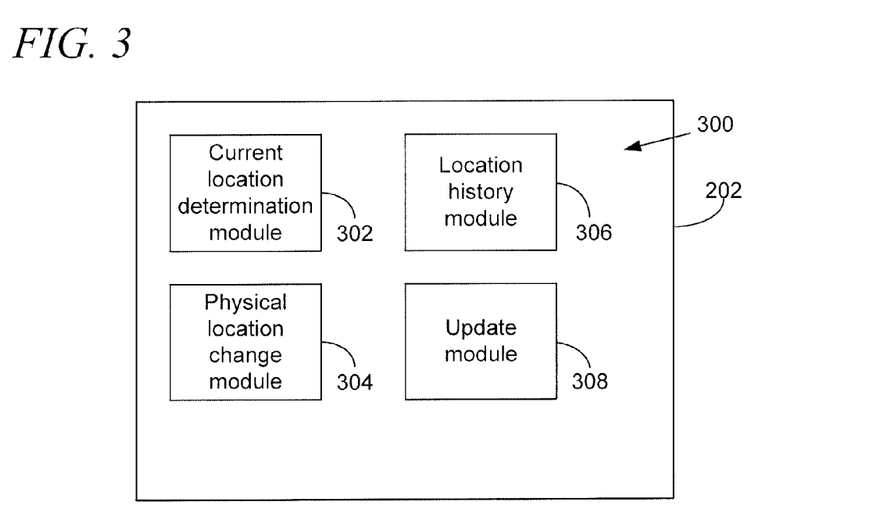
FIG. 3 is a block diagram of exemplary modules for updating physical address location information for E911 services.

FIG. 3 is a block diagram of exemplary modules 300 of software 116 (FIG. 1) for updating physical address location information for E911 services. A current location determination module 302 may be configured to determine geographical coordinates at which a wireless device is located.

A physical location change module 304 may be configured to determine if there has been a physical location change since the last time geographic coordinates of the wireless device were sent to be processed. By comparing the most recent location with the geographic coordinates presently being processed, the physical location change module 304 may be able to determine if there has been a change in the geographical coordinates. One process for making the determination as to whether there has been a physical location change is by using a distance formula for the Cartesian coordinate system. The distance formula is defined as $d=((x2-x1)^2+(y2-y1)^2)^{1/2}$. The physical location change module 304 may use the distance formula to determine whether the wireless device has physically moved more than a predetermined distance between the current geographical coordinates and the geographical coordinates stored as a last geographical coordinate location. In one embodiment, the predetermined distance is 100 feet. However, longer or shorter distances may be utilized. For example, the predetermined distance may be established depending on the communications protocol being utilized.

The location history module 306 may be configured to maintain historical locations of wireless devices. In response to the physical location change module 304 determining that a wireless device has changed physical locations by more than a predetermined distance, the location history module 306 may be utilized to determine if the wireless device has previously been within the predetermined distance of the geographical location at which the wireless device is currently located. If so, then the current physical address location may be returned as the same as previously set. Otherwise, the location history module 306 may return that the wireless device has not been at the physical address location. In addition, if the location history module 306 determines that the wireless device has not been at the physical address location, then the location history module 306 may request a current physical address location from a lookup table on a network or from a user operating the wireless device.

An update module 308 may be configured to update a list of previous geographic coordinates and physical address locations whenever a previous physical address location is looked up or new physical address location that is not currently in the storage unit is entered. The update module 308 may create a reference history of past physical locations in order to avoid the need for a user to re-enter the information in the event the physical address location is visited again.

Figure 4:
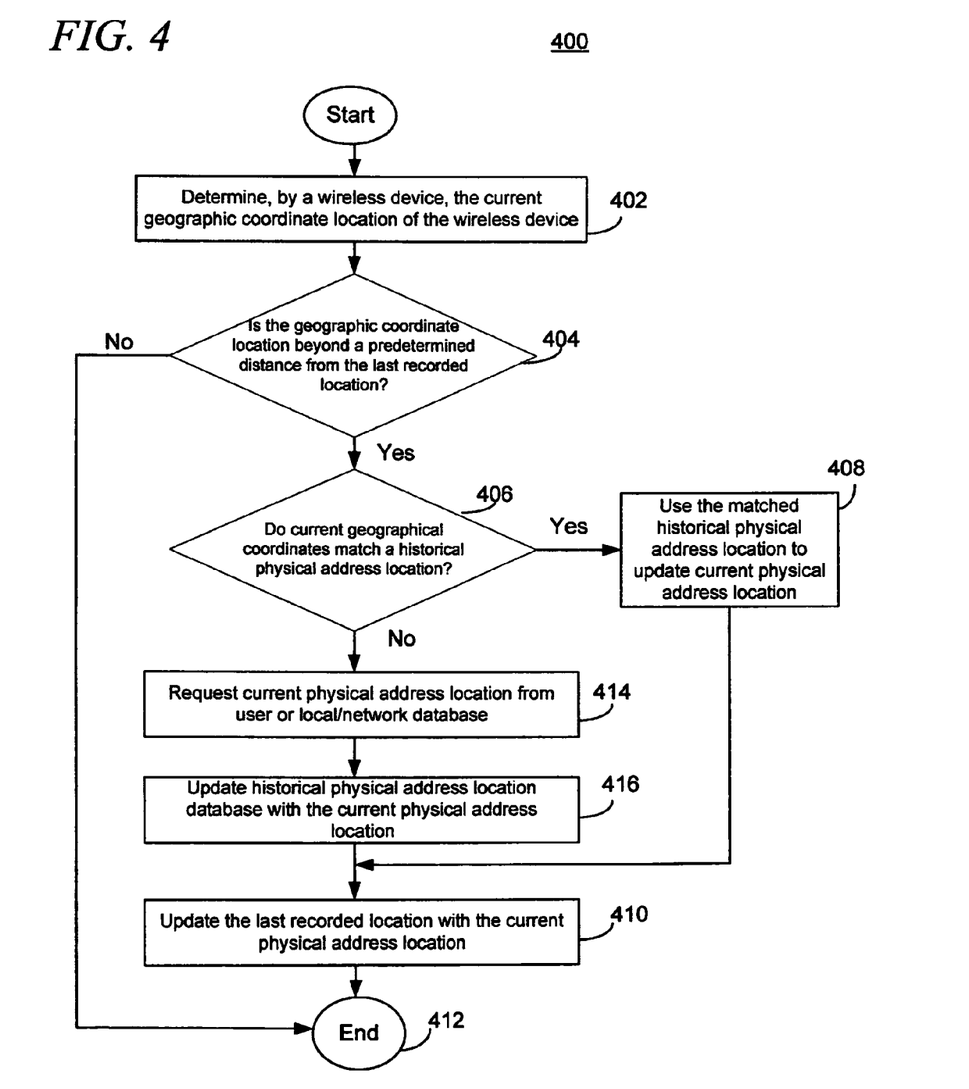
FIG. 4 is a flow diagram of an exemplary process for updating physical address location information of a wireless device for E911 services, where historical physical address location information is contained within the wireless device.

FIG. 4 is a flow diagram of an exemplary process 400 for updating physical address location information of a wireless device for E911 services, where historical address information is contained within the wireless device. The process 400 starts at step 402, where a current geographical coordinate location of the wireless device is determined by the wireless device. Common in wireless devices are GPS chips that are capable of determining, within a very small distance, the exact physical location of the device. The GPS chips may return the location in geographical coordinates to be used for further processing. In step 404, a determination may be made as to whether the current geographical coordinate location is farther than a predetermined distance from a last recorded location may be made. As described in relation to FIG. 3, the distance may be determined by using the distance formula for Cartesian coordinates, as is commonly known in the art. If the geographical coordinate location is the same or within the predetermined distance, the processing ends. However, if the geographical coordinate location is farther than the predetermined distance from the last recorded location, a second query may be performed at step 406 to determine if the current geographical coordinates match or are within the predetermined distance of a physical address location at which the wireless device has previously been. If a match is found, the matched historical physical address location is used to update the current physical address location in step 408. Thereafter, the process 400 may update the last recorded location with the current physical address location at step 410. The process 400 may end at step 412. However, if a match is not found for the geographical coordinates, a request may be made by the wireless device to receive the physical address location from a user input and/or from a local or networked database at step 414. If a current physical address location is not found in the history, the user may enter in the physical address location. The database or data repository containing historical physical address locations for the wireless device may then be updated with the current physical address location at step 416. Storage of the physical address location enables the physical address location to be available for future uses. The record storing the last recorded physical address location may be updated with the current physical address location at step 410. The current physical address location may be used during emergency 911 calls to communicate to a PSAP operator.

Figure 5:
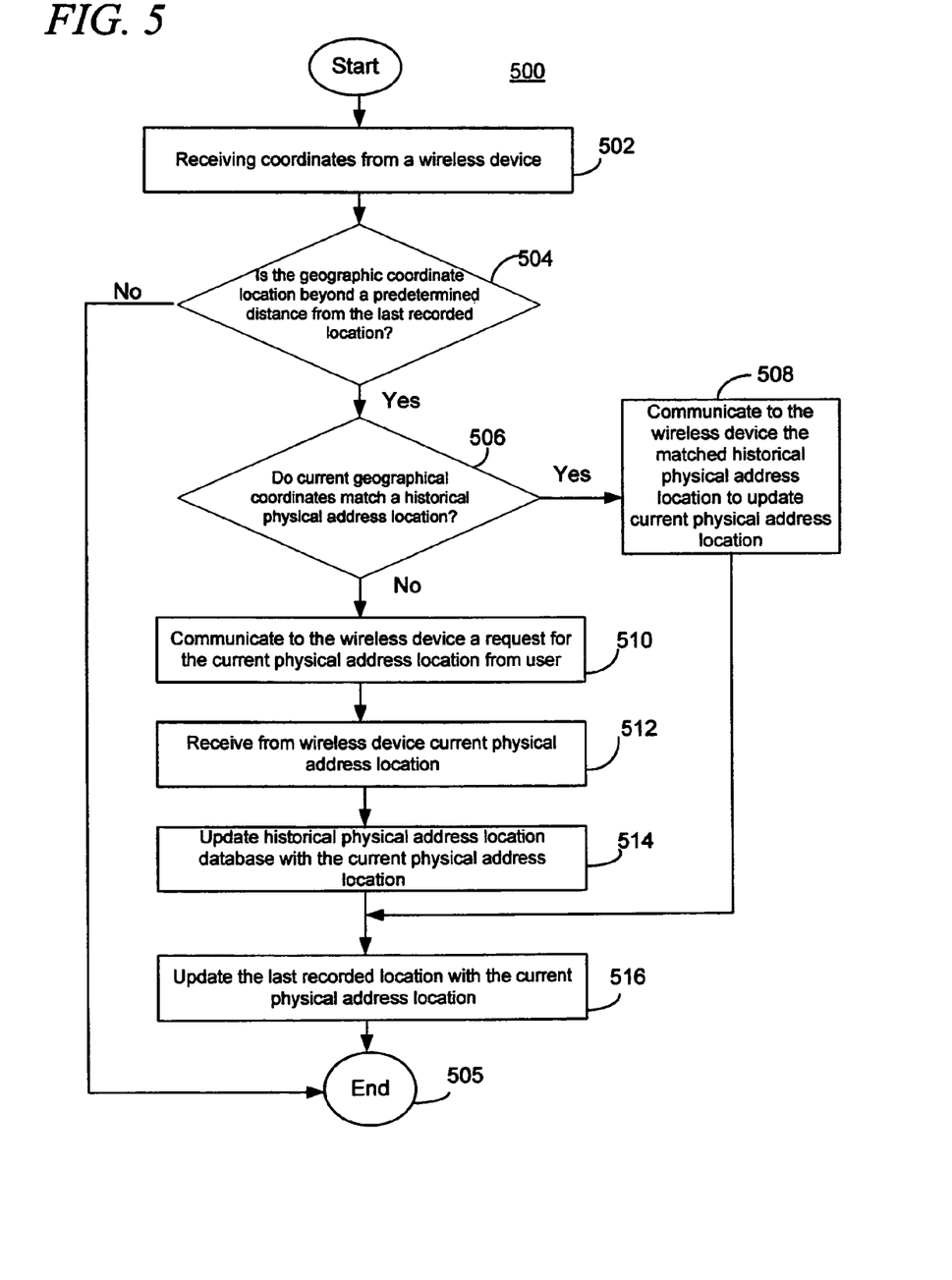
FIG. 5 is a flow diagram of an exemplary process for updating physical address location information of a wireless device for E911 services, where historical physical address location information is located on a network device.

FIG. 5 is a flow diagram of an exemplary process 500 for updating physical address location information of a wireless device for E911 service, where historical address information is located on a network device rather than on a wireless device, as in FIG. 4. In this embodiment, the geographic coordinates are received from the wireless device at a network device in step 502. In step 504, a determination is made as to whether the geographic coordinate location is farther than a predetermined distance from the last recorded location. If there is no change or minimal (i.e., less than a predetermined distance) from the last recorded location, the process ends at step 505. If the change in distance is farther than the predetermined distance, a query may be made to determine if the geographic coordinates match or are within the predetermined distance of geographical coordinates of an historical physical address location at step 506. The historical physical address locations and associated geographical coordinates (see Table I) may be stored within a storage unit located on the network device, as described previously. If there is a match, the matched historical physical address location may be communicated to the wireless device to update the current physical address location in 508. Alternatively, the matched historical physical address location may be communicated to a PSAP in response to an emergency 911 call. The last recorded location may be updated with the current physical address location in 516. If there was no match found at step 506, a request for the user to input a current physical address location is communicated to the wireless device in step 510. At step 512, the current physical address location may be received from the wireless device. The historical physical address location database may be updated with the current physical address location in step 514. The last recorded location may be updated with the current physical address location in 516. The process may end at step 505.

Figure 6:
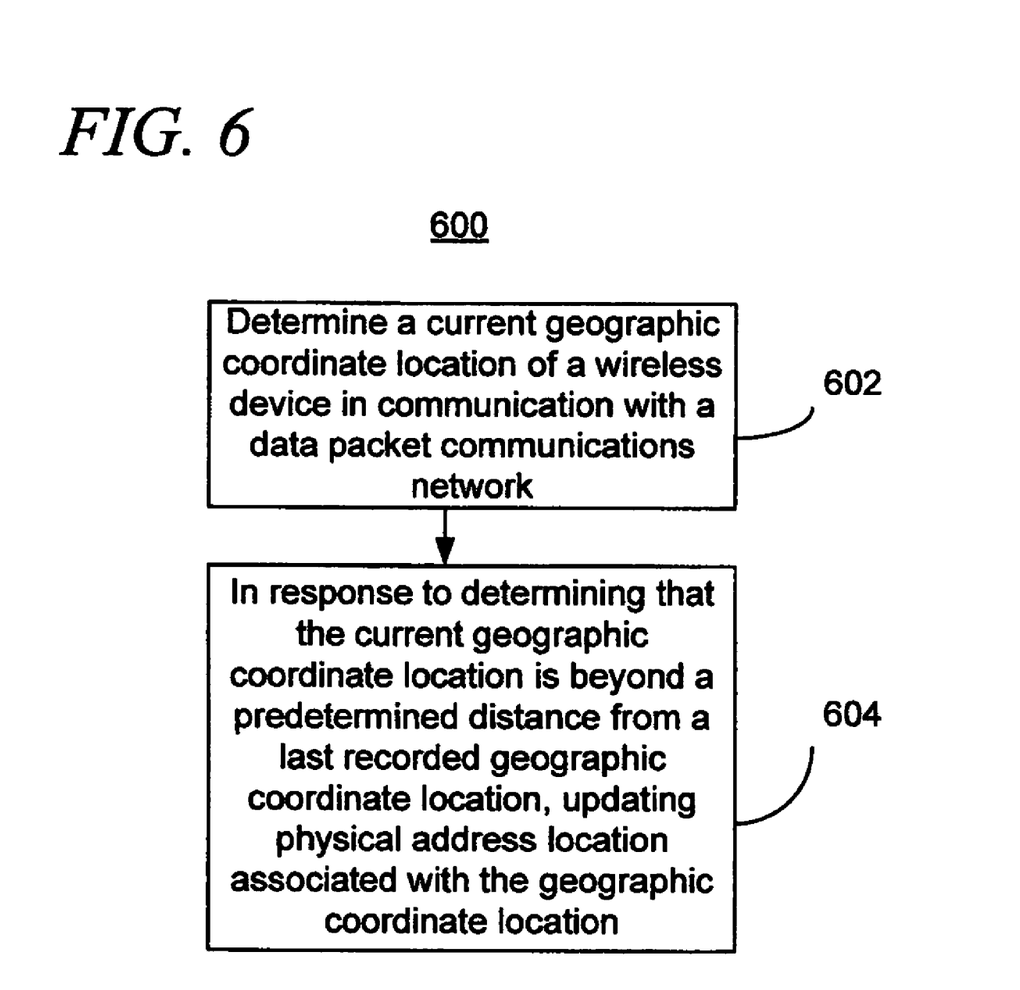
FIG. 6 is a flow diagram of an exemplary method for updating a physical address of a wireless device for E911 services.

FIG. 6 is a flow diagram of an exemplary process 600 for updating location information of voice-over-Internet protocol based devices for E911 service. A determination of the current geographic coordinate location of a wireless device in communication with a data packet communications network may be made at step 602. At step 604, in response to determining that the current geographic coordinate location is beyond a predetermined distance from a last recorded geographic coordinate location, the physical address location associated with the geographic coordination location may be updated. As previously described, the process 600 may be performed on a wireless device or on a server on the data packet communications network.

The previous detailed description of a small number of embodiments for implementing the invention is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A method for updating physical address location information of a wireless device for E-911 services, said method comprising:
    storing a physical address location in memory on the wireless device;
    determining a current physical address location of a wireless device in communication with a data packet communications network; and
    in response to determining that the current physical address location of the wireless device is different from the stored physical address location, updating the physical address location stored in memory on the wireless device with the current physical address location, wherein updating the physical address location comprises:
        querying a history of previous physical address locations of the wireless device;
        determining if the physical address location of the wireless device is in the history of previous physical address locations of the wireless device;
        updating a last recorded physical address location with the current physical address location in response to a determination that the physical address location is in the history of previous physical address locations of the wireless device; and
        prompting a user of the wireless device to input the current physical address location in response to determining that the physical address location is not in the history of previous physical address locations of the wireless device.

2. The method according to claim 1, further comprising:
    replacing the last recorded physical address location with the physical address location of the wireless device.

3. The method according to claim 1, further comprising:
    connecting to the data packet communications network; and
    querying for the physical address location based on geographic coordinate location in response to determining that the physical address location of the wireless device is not found in the history of previous physical address locations of the wireless device.

4. The method according to claim 1, further comprising communicating by the wireless device the current physical address location of the wireless device to a public safety answering point (PSAP) in response to a user dialing 911.

5. The method according to claim 4, wherein the wireless device communicates the physical address location to the PSAP by including the physical address location in a caller ID data packet.

6. A wireless device comprising:
    a processing unit configured to:
        store a physical address location in memory on the wireless device, wherein the physical address location includes a street address;
        determine a current physical address location of the wireless device in communication with a data packet communications network;
        update the stored physical address location with the current physical address of the wireless device, in response to determining that the current physical address location of the wireless device is beyond a predetermined distance from the stored physical address location, wherein updating the physical address location comprises:
            querying a history of previous physical address locations of the wireless device;
            determining if the physical address location of the wireless device is in the history of previous physical address locations stored for the wireless device;
            performing a predetermined action in response to determining if the physical address location of the wireless device is in the history of previous physical address locations stored for the device; and
            prompting a user of the wireless device to input the current physical address location in response to determining that the physical address location is not in the history of previous physical address locations of the wireless device.

7. The system according to claim 6, wherein the processing unit, in performing the predetermined action, is further configured to:
    update a last recorded physical address location found in the history of previous physical address locations in response to determining that the physical address location of the wireless device is found in the history of previous physical address locations; and
    replace the last recorded physical address location with the physical address location of the wireless device.

8. The system according to claim 6, wherein the predetermined action includes the processing unit connecting to the data packet communications network to query for the physical address location based on geographic coordinate location of the wireless device in response to the determination that the physical address location of the wireless device is not found in the history of previous physical address locations of the wireless device.

9. The system according to claim 6, wherein the wireless device is a VoIP device.

10. The system according to claim 6, wherein the physical address location is updated in response to the processing unit determining that the wireless device has moved beyond a predetermined distance of 100 feet.

11. The system according to claim 6, wherein the processing unit is further configured to communicate the physical address location to a PSAP in response to a user dialing 911.

* * * * *